United States Patent [19]
Lester

[11] 3,948,225
[45] Apr. 6, 1976

[54] ROTARY INTERNAL COMBUSTION ENGINE WITH PARALLEL COEXTENSIVE ROTORS

[76] Inventor: William M. Lester, 8 Brayton Road, Livingston, N.J. 07039

[22] Filed: Nov. 27, 1974

[21] Appl. No.: 527,592

[52] U.S. Cl. .............................. 123/8.43; 418/13
[51] Int. Cl.² .......................................... F02B 53/08
[58] Field of Search ....... 123/8.07, 8.23, 8.25, 8.41, 123/8.43; 418/13; 127/8.19, 8.29

[56] References Cited
UNITED STATES PATENTS

| | | | |
|---|---|---|---|
| 3,329,132 | 7/1967 | De Castelet | 123/8.41 X |
| 3,791,352 | 2/1974 | Takacs | 123/8.43 |
| 3,800,763 | 4/1974 | Pouit | 123/8.07 X |
| 3,839,995 | 10/1974 | Williams | 123/8.41 |

FOREIGN PATENTS OR APPLICATIONS

| | | | |
|---|---|---|---|
| 589,505 | 3/1959 | Italy | 123/8.41 |
| 789,091 | 8/1935 | France | 418/13 |
| 623,208 | 12/1935 | Germany | 123/8.41 |
| 424,981 | 9/1947 | Italy | 123/8.41 |

*Primary Examiner*—C. J. Husar
*Assistant Examiner*—Leonard Smith
*Attorney, Agent, or Firm*—J. B. Felshin

[57] ABSTRACT

This engine has coextensive rotors on parallel axes in coextensive cavities having parallel axes. In each cavity there is an inlet and compression chamber on one side of the rotor in said cavity and an explosion and exhaust chamber on the other side of said rotor in said cavity. The engine also has valve means to allow compressed combustion gas from the inlet and compression chamber of one cavity to pass to the explosion and exhaust chamber of the other cavity. Each rotor carries diametrically disposed, outwardly spring pressed radial pistons to sweep through said chambers in wiping relation to the internal surfaces of said cavities. The rotors are connected for rotation in the same direction at equal speeds.

2 Claims, 7 Drawing Figures 3,948,225

ROTARY INTERNAL COMBUSTION ENGINE WITH PARALLEL COEXTENSIVE ROTORS

This invention relates to rotary internal combustion engines. An object of this invention is to provide an engine of the character described having a pair of cavities in each of which there is rotatably mounted, a rotor, with the rotors in said cavities being on parallel axes, coextensive and connected to rotate at the same rate of speed in the same direction, with each rotor dividing its cavity into an inlet and compression chamber and an explosion and exhaust chamber.

Another object of this invention is to provide in an engine of the character described, valve means to pass compressed gas from the compression end of the inlet and compression chamber of one cavity to the explosion end of the explosion and exhaust chamber of the other cavity, in timed sequence.

Still another object of this invention is to provide in an engine of the character described, cam controlled means to actuate valves which allow passage of compressed gases from the compression ends of the inlet and compression chambers to the explosion ends of said explosion and exhaust chambers, in sequence, depending on the angles of rotation of said rotors.

A further object of this invention is to provide a strong and durable engine of the character described which shall be relatively inexpensive to manufacture and operate, and which shall be light in weight and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

Figure 1:
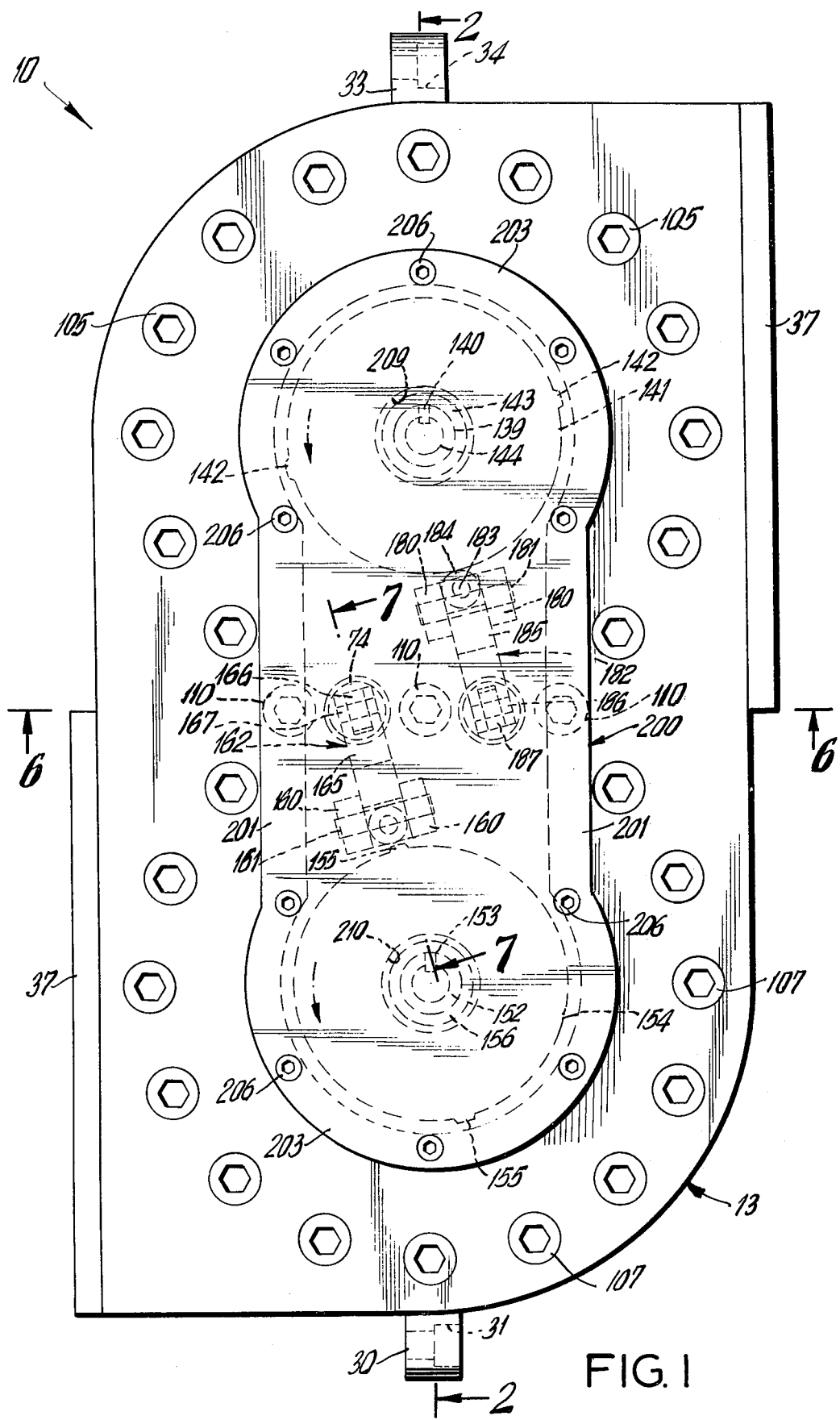
FIG. 1 is a side elevational view of an engine embodying the invention.

Referring now in detail to the drawing, 10 designates a rotary combustion engine embodying the invention. Engine 10 constitutes an improvement of the engine shown in applicant's copending application Ser. No. 487,007 filed July 10, 1974 for Rotary Internal Combustion Engine.

One difference between the present engine and the engine of said copending application is that in the present engine, as will appear hereinafter, the rotors are parallel and coextensive, whereas in said copending application the rotors are coaxial.

Engine 10 comprises a casing 11. Said casing 11 comprises a central section 12 to one side of which is attached, in manner hereinafter appearing, a side section 13, and to the other side of which is attached, as will be explained, a side section 14.

The central section 12 may be a casting, and has a top flat surface 15, a bottom flat surface 16, one flat end surface 17 connected to said top surface 15 by a curved 90° surface 18, and an opposite flat end surface 20 connected to flat bottom surface 16 by curved 90° surface 21. Said section 12 has opposed flat parallel surfaces 23 and 24. The side sections 13, 14 have outer edges registering with surfaces 15, 16, 17, 18, 20, 21 of the central section 12.

The central section 12 is formed with a pair of parallel, coextensive substantially elliptical shaped cavities 25, 26 having parallel transverse, coextensive axes in a vertical plane. Cavity 25 has a pair of inner, opposed part cylindrical surfaces 25a, 25b connected by a pair of opposed coextensive internally curved surfaces 25c, 26d. The long axes of said cavities are horizontal. The short axes are in a common vertical plane.

The cavity 26 has a pair of opposed, part cylindrical surfaces 26a, 26b connected by a pair of opposed coextensive internally curved surfaces 26c, 26d. The cavities 25, 26 extend to surfaces 23, 24 of the central section.

Extending from surface 17 of the central section are a pair of lugs 30 formed with countersunk opening 31 for bolts to attach the engine to a base, or chassis.

Extending from surface 20 are a pair of lugs 33 similar and symmetrically disposed relative to lugs 30, and formed with countersunk openings 34 for bolts to attach the engine to a base.

The surface 15 of central section 12 is at the top of the engine 10, and the surface 16 is at the bottom of said engine. Said central section 12, at the portion of its top surface 15, which lies somewhat above and below cavity 25, is formed with a cooling chamber 36 closed by a plate 37. Said chamber 36 forms an inner curved surface 39, side parallel surfaces 40, 41 and end parallel surfaces 40a, 41a. Extending from surfaces 39, 40 are parallel baffles 42 terminating short of surface 41. Extending from surfaces 39, 41 are parallel baffles 43, one disposed between baffle 42 and one disposed between baffle 43 and surface 41a. The baffles 42, 43 form a zig-zag passage for circulating water or other cooling liquids.

Plate 37 is fixed to section 12 by screws 45 passing through clearance countersunk openings 45a and screws into threaded openings 45b in section 12.

Plate 37 has an opening 47 plugged by a suitable plug in one corner, and a similar plugged hole 48 disposed in a diagonal corner, for circulating water or other cooling liquid through the zig-zag passage in the chamber 36. The plugs can be replaced by suitable water pipes for this purpose.

Figure 3:
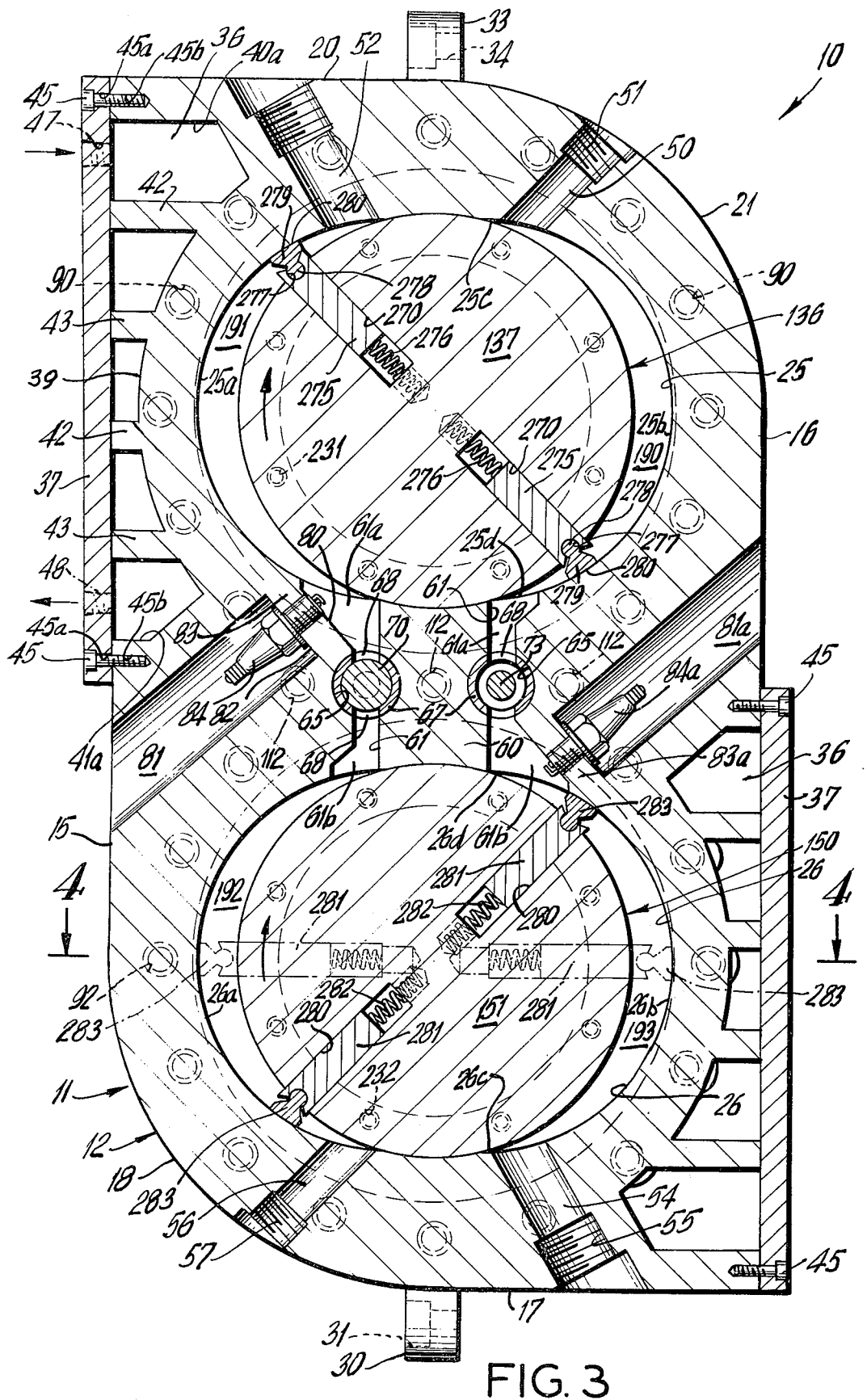
FIG. 3 is a cross-sectional view taken on line 3—3 of FIG. 2.
Figure 4:
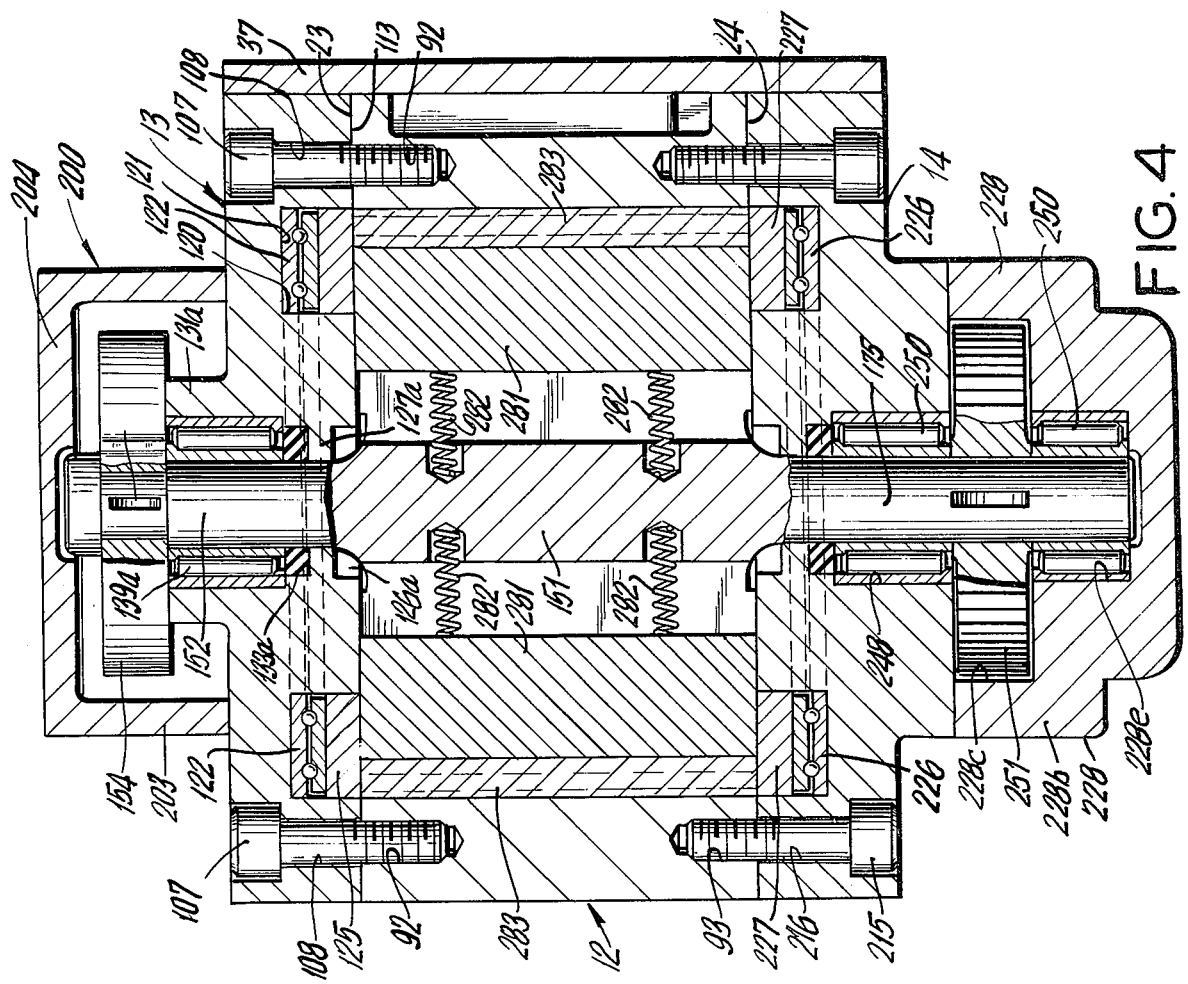
FIG. 4 is a cross-sectional view taken on line 4—4 of FIG. 3 with the rotor of FIG. 4, advanced through an angle of 45°.
Figure 5:
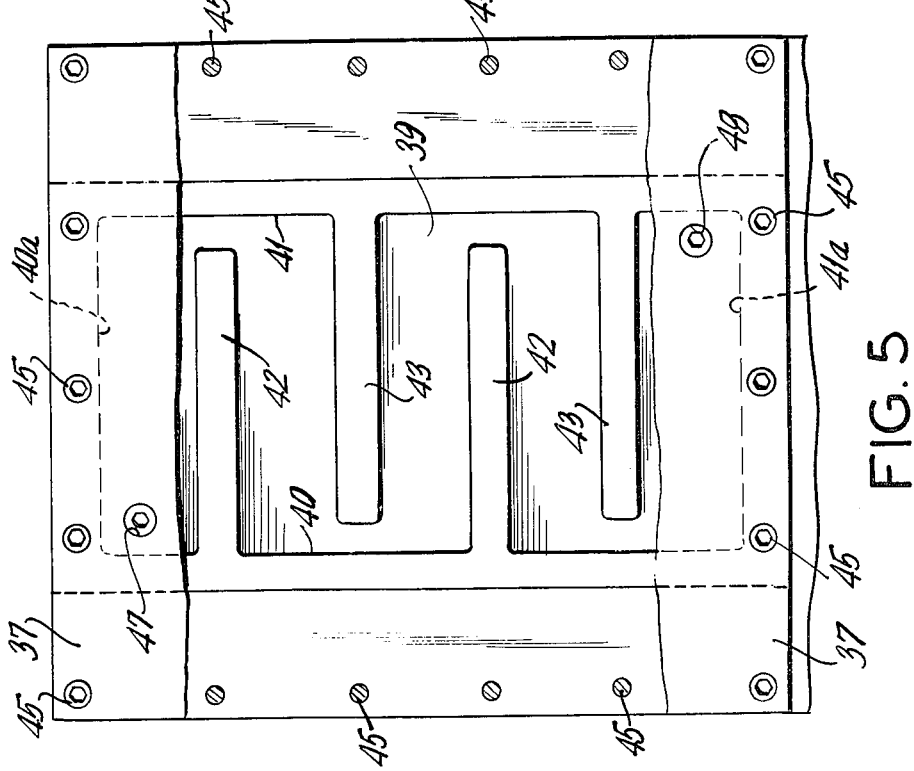
FIG. 5 is a top partial view of the engine with part of the cover plate for the cooling chamber broken away.
Figure 6:
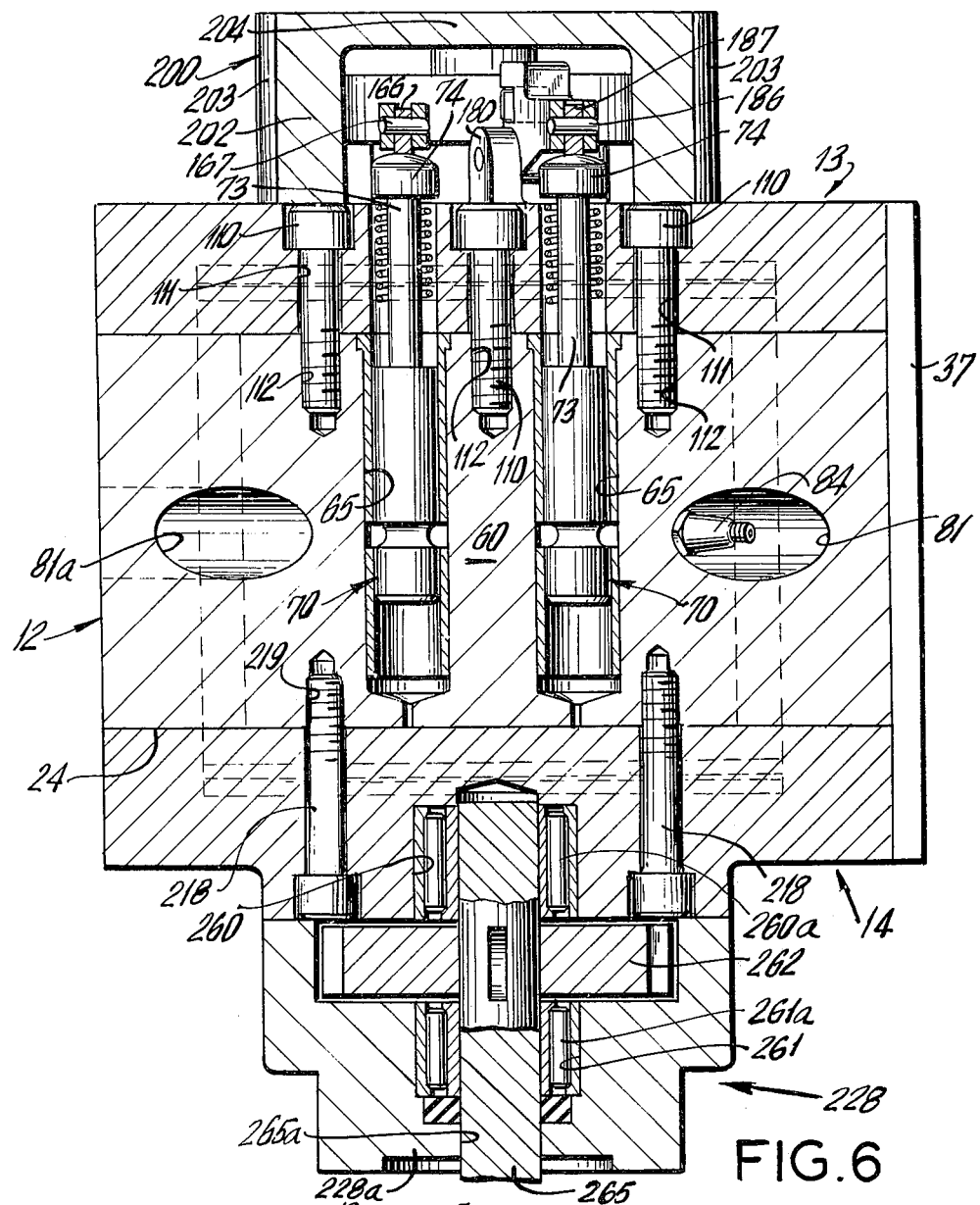
FIG. 6 is a cross-sectional view taken on line 6—6 of FIG. 1.

A similar, symmetrical cooling chamber 36 with cover plate 37 is provided at surface 16, at one side of cavity 26, as shown at the lower right side of FIG. 3.

Said section 12 is formed with an intake or inlet passage 50 slanted upwardly to the right in FIG. 3 and communicating with cavity 25. The upper end of said passage 50 is enlarged and internally threaded as at 51 for engagement with an inlet or intake pipe for carbureted gaseous fuel passing to the cavity.

Said central section 12 is also formed with an exhaust passage 52 slanting upwardly to the left as seen in FIG. 3, and communicating also with cavity 25. The upper end of said passage has an enlarged internally threaded portion 53 for connection to an exhaust pipe as will be explained hereinafter. Said passages lead to cavity 25 at both ends of surface 25c and are centrally located between side surfaces 23, 24 of said central section.

Passage 50 extends to surface 21 whereas passage 52 extends to surface 20, as shown in FIG. 3.

At the opposite end of section 12 there is formed an exhaust passage 54 inclined downwardly and to the right, looking at FIG. 3. At the outer end of passage 54 is an enlarged, internally threaded portion 55 leading to surface 17. The passage 54 extends to cavity 26 at one end of surface 26c. An exhaust pipe may be connected to threaded opening 55.

Said central section 12 is also formed with an inlet or intake passage 56 having an enlarged, internally threaded portion 57 leading to curved surface 18. Passage 56 is inclined downwardly and to the left looking at FIG. 3, and leads to the opposite end of surface 26c, an inlet or intake pipe for carbureted combustion gas may be connected to threaded opening 57.

Between the cavities 25, 26, section 12 has a portion 60 formed, for the purpose hereinafter described, with a pair of parallel passages 61, connecting cavity 25 with cavity 26. Each of passages 61 has an enlarged portion 61a at its upper end, and an enlarged portion 61b at its lower end looking at FIGS. 3 and 7. Passages 61a, 61b lead to ends of surfaces 25d, 26d of cavities 25, 26, respectively. Between enlarged portions 61a, 61b are narrow aligned passage portions 61c, 61d.

Figure 7:
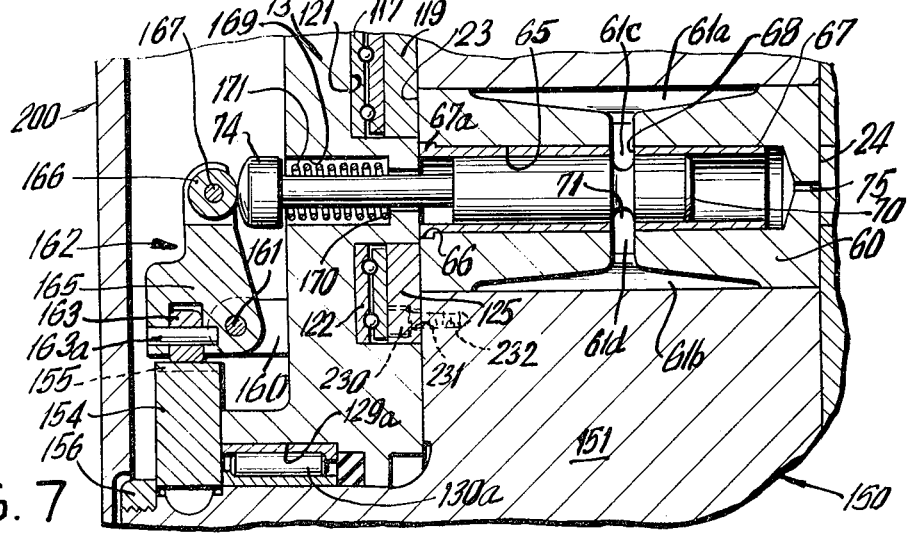
FIG. 7 is a cross-sectional view taken on line 7—7 of FIG. 1.

Said portion 60 of said central section 12 is formed with a pair of parallel bores 65 between aligned passages 61c, 61d (FIG. 7). The bores 65 enter the central section 12 at surface 23 thereof. At surface 23, bores 65 are countersunk or enlarged as indicated at 66. In each bore 65 is a sleeve 67 having a collar 67a received in countersunk portion 66 of bore 65. Each sleeve 67 has openings 68 registering with passages 61c, 61d. In each sleeve 67 is a valve rod or plunger 70 slidable in said sleeve and formed with an annular groove 71 aligned with openings 68 in one longitudinal position of said rod. On each rod 70 is an axial stem 73 passing through the plane of surface 23. At one end of said stem 73 is a head 74 for purpose hereinafter explained. The end of bore 65 which terminates short of surface 24 is connected to said surface by an axial relief passage 75. In the position of FIG. 7, cavities 25, 26 are connected through passages 61b, 61d, 61c, 61 a. However if the rod 70 is spring returned to the left, from the position of FIG. 7, said rod will close the opening 68 in sleeve 67 to cut off communication between said cavities 25, 26. Looking at FIG. 3, it will be seen that the upper end of passage 61 at the left of said figure is larger than the upper end of the passage 61 on the right of said figure. Said passage 61 are symmetrical about a horizontal plane through the axes of bores 65 and about a vertical plane centrally between said bores. Thus, at the upper end of passage 61 at the left side of FIG. 3, there is an inclined surface 80. Said central section 12 is formed with a socket 81 inclined upwardly to the right from surface 15, looking at FIG. 3. Said socket 81 terminates in a surface 82 parallel to surface 80, with a wall 83 between said surfaces. Mounted on and passing through a central hole in said wall 83 is a spark plug 84, the firing end of which is in portion 61a of passage 61 and near cavity 25. In the lower end 61b of the passage 61 at the right side of FIG. 3, is a wall 83a symmetrical with respect to wall 83, about horizontal and vertical planes. A socket 81a slants upwardly to the right, looking at FIG. 3, and extends to surface 16.

A spark plug 84a centrally mounted on wall 83a is disposed axially of socket 81a and its firing end is near the cavity 26. The sockets 81, 81a are centrally located between surfaces 23, 24 of the central section 12.

For the purpose hereinafter appearing, central section 12 is formed, at the surfaces 23, 24 thereof, with two aligned sets of thirteen, parallel symmetrically disposed similar internally threaded holes 90, 91 respectively. The holes in each set are spaced 22½ apart and are arranged in a partial circle about the transverse central axis of the cavity 25. The middle holes 90, 91, of said set of holes, are closest to surface 20, with six holes on each side of the middle holes. Said central section 12 is also formed, at the surfaces 23, 24 with two aligned sets of thirteen, parallel symmetrically disposed, internally threaded holes 92, 93 respectively. The holes in each set are spaced 22½° apart and are arranged in a partial circle about the transverse central axis of cavity 26. The middle holes 92, 93 of said sets of holes are closest to surface 17, with six holes on each side of the middle holes. Side section 13 is attached to surface 23 of the central section 12 by thirteen bolts 105 passing through countersunk clearance holes 106 in said side section, and screwed into threaded holes 90, and by thirteen bolts 107 passing through countersunk clearance holes 108 in said side section, and screwed into threaded holes 92. Said side section 13 is also fixed to the central section 12 by three horizontally aligned bolts 110 passing through clearance countersunk holes 111 in said side section and screwed into an internally threaded, registering holes 112 in the central section 12 and located centrally between surfaces 25d, 26d. Threaded holes 112 lie in the plane of the axes of the bores 65 equally spaced therefrom. The central hole 112 lies in both the circles for the holes 90 and 92, which circles are tangent.

Said side section 13 has an inner flat surface 113 contacting surface 23. At said inner surface 113 there is formed an annular groove 114 concentric with respect to the axis of cavity 25. Groove 114 has an inner end surface 116. In groove 114 is an annular ball bearing 117. Also in said groove 114, between surface 116 and the plane of contacting surfaces 23, 113 is an annular rotary ring or plate 119 for the purpose hereinafter appearing.

At said inner surface 113 of said side section 13, there is also formed an annular groove 120 concentric with the axis of cavity 26 and having an inner surface 121. In said groove 120 and against said surface 121 is an annular ball bearing 122. Between ball bearing 122 and the plane of surfaces 113, 23 is an annular ring or plate 125. The ball bearings 117 and 122 each has a race fixed to the side section 13 and a rotary race which rotates with the ring or plate it contacts, in the well known manner.

Said side section 13 is also formed at its inner surface 113 with a countersunk hole 126 concentric with the axis of cavity 25, and with an annular flange 127 projecting inwardly of said hole. Flange 127 forms a central hole 128. Extending from hole 126 is an enlarged hole 129. Said side section 13 has an outer surface 130 from which extends outwardly, annular flange 131 surrounding and concentric with the outer end of bore or hole 129. Contacting the outer surface of flange 127 is an oil seal 133. In the enlarged opening 129 there is a needle bearing 134 for the purpose hereinafter appearing.

Figure 2:
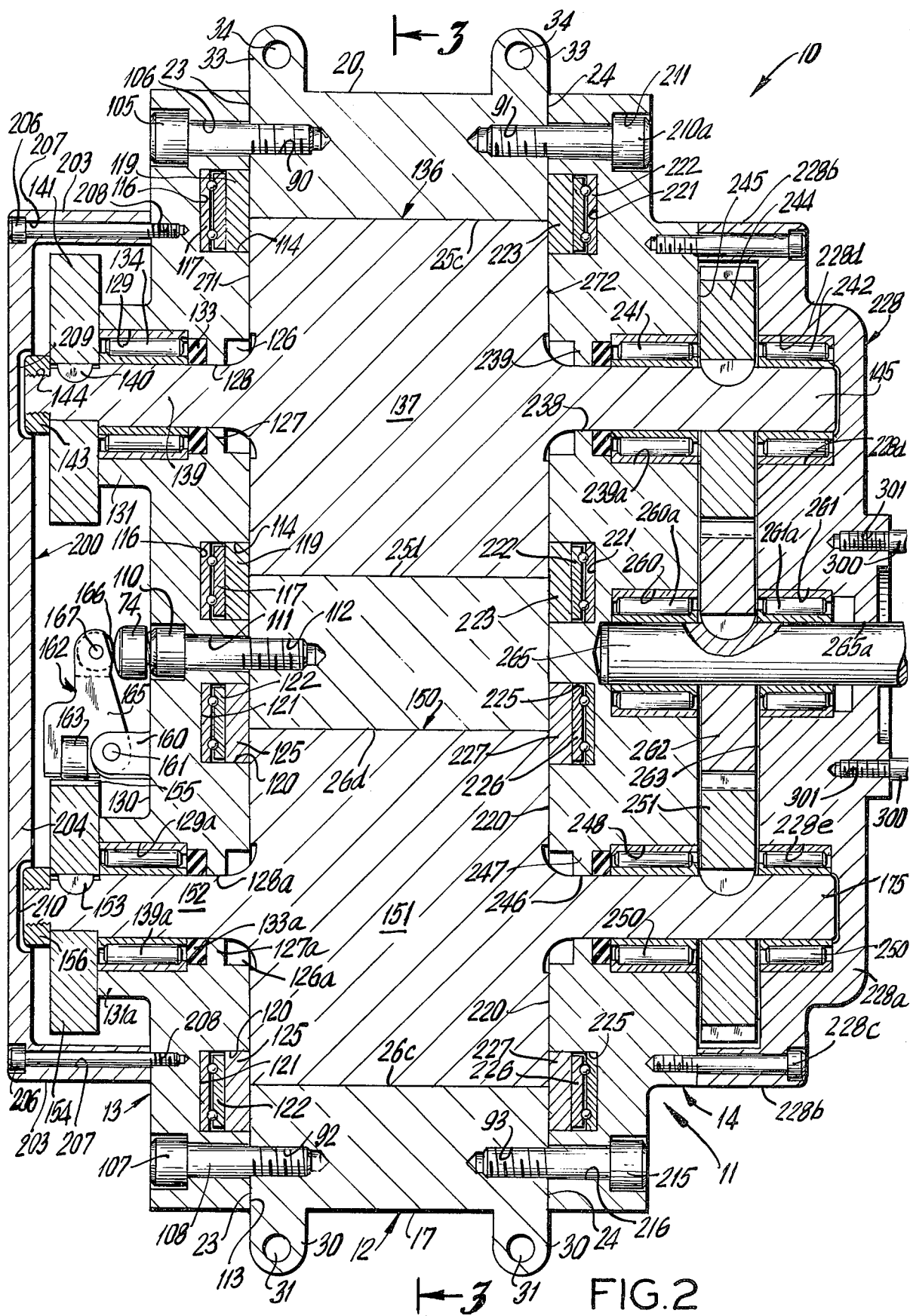
FIG. 2 is a cross-sectional view taken on line 2—2 of FIG. 1.

In cavity 25 there is a rotor 136 comprising a cylindrical portion 137 having an axis coaxial with the axis of cavity 25 and contacting curved surfaces 25c, 25d. Extending to one side of said cylindrical portion 137 is an axial shaft 139 journalled in bearing 134 and passing through the hole in flange 127 and through the center-hole of bushing 133. Axle 139 passes beyond the end of flange 127, as seen in FIG. 2 of the drawing. Fixed on the projecting end of axle 139 as by a key 140 is a cam disc 141 formed with a pair of cam bumps 142 spaced 180° apart. A nut 143 screwed to a threaded end 144 of axle 139 serves to keep the cam disc 141 on said axle.

Extending from said cylindrical portion 137 in a direction oppposite to the direction of axle 139, is an axle 145 projecting beyond surface 24 of the central section, as seen in FIG. 2 of the drawing.

Said side section 13 is also formed with a countersunk opening 126a, flange 127a, opening 128a and opening 129a, similar to opening 126, flange 127, opening 128 and opening 129 and all coaxial with cavity 26. Against flange 127a an oil seal 133a similar to oil seal 133. Side section 13 also is provided with an outwardly extending flange 131a similar to flange 131 and concentric with hole 129a.

Rotatably mounted in cavity 26 is a rotor 150 similar to rotor 136 and comprising a cylindrical portion 151 contacting surfaces 26c, 26d and coaxial with said cavity 26. It will be noted that the radius of part cylindrical surfaces 25a, 25b, 26a, 26b is somewhat less than the radius of cylindrical rotor portions 137, 151. The curved surfaces 25c, 25d and 26c, 26d have a radius of curvature substantially same as the radius of curvature of cylindrical portions 137, 151 of the rotors 136, 150, except for tolerances necessary to allow the rotors to freely rotate past said surfaces 25c, 25d, 26c, 26d.

Extending from rotor portion 151 is an axle 152 passing through opening 128a and journalled in needle bearing 139a disposed in opening 129a between thrust bushing 133a on flange 127a, and the outer end of flange 131a. Axle 152 extends beyond flange 131a and on the extending portion of the axle is mounted, by means of a key 153, a cam disc 154 provided with a pair of cam bumps 155 spaced 180°. A nut 156 on axle 152 holds the cam disc 154 on said axle.

Side section 13 is provided with a pair of spaced apertured ears 160 near flange 131a and inclined upwardly and outwardly looking at FIG. 1 and carrying a cross hinge pin 161 on which is hinged on actuator bellcrank 162 also inclined upwardly to the left, looking at FIG. 1. Said actuator bellcrank 162 carries a follower 163 on a pin 163a on an axis perpendicular to pin 160, and contacting cam disc 154. Said bellcrank actuator has an arm 165 carrying at its outer end, a follower 166 on a pin 167 perpendicular to pin 163a. Follower 166 contacts the head 74 on stem 73 as shown in FIG. 7 of the drawing. Said side section 13 has a countersunk through opening 169 through which the stem 73 passes. At the inner end of opening 169 is an annular shoulder 170. Surrounding said stem 73 and interposed between shoulder 170 and head 74 is a coil compression spring 171 which urges the valve plunger or rod 70, to the left, looking at FIG. 7. When the follower 163 is not contacting a bump 155, spring 171 moves and retains the valve rod 70 in a position to the left of the position of FIG. 7 thereby closing the openings 61c, 61d to prevent passage of gases down from cavity 25 to the cavity 26. When a bump 155 of cam disc 154 contacts follower 163, the bell crank 162 is rocked in a clockwise direction, looking at FIG. 7, to the position of said figure, to thereby shift valve rod 70 to the right to uncover openings 61c, 61d and hence allow gases to pass around groove 71 and pass from the cavity 25 to the cavity 26. This action occurs twice during every revolution of the rotor 150, as will appear hereinafter. Cylindrical portion 151 of rotor 150 has an axle 175 extending oppositely to axle 152 and coaxial therewith for the purpose hereinafter appearing.

Integrally formed with side section 13 are a pair of spaced, parallel apertured ears 180 similar to ears 160 and disposed symmetrically with respect thereto about a vertical plane passing through the axes of rotors 136, 150 and about a horizontal plane passing through the axes of bores 65, and carrying a cross pivot pin 181 similar to pivot pin 161. Pivoted on said pin 181 is an actuator bell crank 182 similar to bell crank 162. One arm of the bell crank 182 supports a pin 183 carrying a follower roller 184 (similar to pin 163a and follower roller 163). The actuator 182 has an arm 185 supporting a pin 186 (similar to arm 165 and pin 167) on which pin there is rotatably mounted a follower roller 187, similar to roller 166, and contacting the head 74 of a stem 73 on a plunger or rod 70 in the bore 65 at the right side, looking at FIG. 3. The plunger or rod 70 in both bores 65 are similar. Both plungers 70 are biased to the left, looking at FIG. 7 by a coil compression spring 171 interposed between the head 74 and a depressed surface 170 in side section 13. As seen in FIG. 1, the bellcrank 162 slants upwardly and to the left, while bellcrank 182 slants downwardly to the right. Follower roller 184 is pressed against the outer edge of cam disc 141. When the bumps 142 strike the follower roller 184, twice during each revolution of said cam disc 141, the plunger 70 which it controls, opens the passages 61c, 62d to each other, to allow compressed combustion gas to pass from cavity 25 to the cavity 26.

It will be noted that rotor portion 137 in cavity 25, forms an intake or inlet chamber 190 at one side thereof, (on the right upper side of FIG. 3) having an upper inlet and a lower compression end, and an exhaust chamber 191 at the other side thereof, at the left upper side of said figure, having a lower explosion end and an upper exhaust end. Also the rotor portion 151 divides the lower chamber 26 (looking at FIG. 3) into a lower left intake or inlet chamber 192 having a lower inlet end and an upper compression end and an exhaust chamber 193 at the other side thereof, (at the right lower end of FIG. 3) having an upper explosion end and a lower exhaust end.

The cam disc 141, 154 are enclosed by a cover 200 having parallel walls 201 connected by part cylindrical walls 203, all extending from an outer wall 204 parallel to side section 13 and spaced therefrom. Headed studs 206 pass through countersunk holes 207 all around walls 202, 203 and are screwed into threaded holes 208 in side section 13.

Walls 203 are spaced outwardly of cam disc 141, 154. The inner surface of wall 204 may be recessed at 209, 210 to make room for the nuts 143, 156, respectively.

The side section 14 (See FIG. 2) is fixed to surface 24 of the central section 12 by thirteen bolts 210a aligned with the thirteen bolts 105. Said bolts 210a passes through countersunk clearance holes 211 in side section 14 and are screwed into the internally threaded holes 91 in the central section (which holes are aligned with holes 90). Side section 14 is also attached to the central section by thirteen bolts 215 aligned with the bolts 107 and passing through countersunk clearance holes 216 in said side and screwed into internally threaded holes 93 in said central section 12, which threaded holes are aligned with the threaded holes 92 in said central section. Said side section 14 is also attached to said central section 12 by two parallel bolts 218, aligned with the two outer bolts 110, and passing through suitable countersunk clearance holes in side section 14 and screwed in suitable screw threaded holes 219 in the central section.

Said side section 14 is formed at its inner surface 220 with an annular groove 221 aligned with annular groove 114 and similar thereto and receiving a ball bearing 222 and an annular ring or plate 223, similar to ball bearing 117 and ring 119.

Said side section 14 is also formed at its inner side with an annular groove 225 aligned with groove 120 and receiving a ball bearing 226 and an annular ring or plate 227, similar to bearing 122 and ring 125.

Rings 119, 223, 125 and 227 contact the left and right sides of the cylindrical portions 137, 151 of rotors 136, 150 and are fixed thereto by circles of bolts 230 passing through clearance holes 231 in said rings and through internally threaded holes 232 in said cylindrical portions.

It will now be understood that rings 119 and 223 rotate with rotor 136, whereas rings 125, 227 rotate with rotor 150 and that friction between said rings and said side sections 13, 14 is greatly reduced by the ball bearing 117, 222, 122 and 226.

Fixed to side section 14 is a cover 228 comprising an outer wall 228a having flanges 228b bolts to side section 14 by bolts 228c passing through said flanges. Said cover at its inner side is formed with bearing holes 228d, 228e.

Axle 145 passes through a hole 238 in a flange 239 formed in through hole 239a. Surrounding said axle 145 and in holes 239a and 228d are two spaced sets of needle bearings 241, 242 between which there is keyed to said axle 145, a gear 244 somewhat spaced from the outer surface 245 of said side section 14.

Axle 175 passes through a hole 246 in a flange 247 formed in a through hole 248 in side section 14. Axle 175 passes beyond said side section 14 into hole 228e. In holes 248 and 228e are spaced sets of needle bearing 250 between which is a gear 251 keyed to said axle 175. Gear 251 is similar to gear 244.

Said side section 14 is also formed with a bearing hole 260 aligned with a bearing hole 261 in cover plate 228. In holes 260, 261 are spaced needle bearings 260a, 261a, respectively journalling a gear 262 located in a cavity 263 between flanges 228b of the cover. Gear 262 is similar to gears 244, 251 and meshes with both. Gear 262 is keyed to a shaft 265 passing through bearings 260a, 261a. The shaft 265 is an output shaft and passes through a hole 265a in wall 228a of cover 228.

Rotor portion 137 is formed with diametrically opposed radial slots or grooves 270 extending to the parallel end surfaces 271, 272 of said rotor portion which faces inner surfaces 113, 220 of side sections 13, 14. Portions of surfaces 271, 272 and 113, 220 may be cut away to reduce friction between rotor 136 and the fixed side sections 13, 14, if desired. Slidably mounted in said grooves 270 are pistons 275. Said pistons 275 are biased radially outwardly in opposite directions by coil compression springs 276 interposed between the inner edges of said pistons 275 and the inner ends of said grooves or slots 270.

At the outer ends of said pistons 275 are formed part cylindrical grooves 277 receiving part cylindrical portions 278 of wipers 279 having outer surfaces 280 contacting the inner surface of cavity 25. The pistons 275 rotate together with the rotor 136 and with the rings 119, 223, but can slide radially inwardly and outwardly, with slidable contact at its side edges with the rings 219, 223. The wipers 279 have rotary attachment to the pistons and wiping action with respect to surfaces 25a, 25b, 25c and 25d of the cavity 25.

The cylindrical portion 151 of cavity 26 also has similar slots or grooves 280 to receive similar pistons 281 biased radially outwardly by similar coil compression springs 282 and carry similar wipers 283 having similar wiping contact with the inner surfaces 26a, 26b, 26c, 26d of cavity 26. Pistons 281 are always at right angles to the pistons 275.

The rotors 136, 150 always rotate in the same direction at equal rates of speed, since all the gears 244, 251 and 262 are similar. Shaft 265 rotates in a direction opposite to direction of rotation axles 145, 175.

It will now be understood that the rotors rotate in the direction of the arrows in FIG. 3. Carbureted fuel gas enters at inlet passage 50 in front of a piston 275. As the rotor 136 rotates in a clockwise direction, the gas in front of the piston 275 compresses in chamber 190, and the compressed gas is passed through openings 61a, 61b of the valve in the bore 65 at the right side of FIG. 3, behind a piston 281 in chamber 193 of cavity 26. At that time the spark plug which has its firing end in opening 61b fires and explodes the gas to move the piston 281 in chamber 193 to rotate and push exploded gases through exhaust outlet 54. While gases are exhausted through passage 54, carbureted gas enters inlet 56 and the gases are compressed by piston 281 in chamber 192 of cavity 26. Thereafter the compressed gases are allowed to pass to chamber 191 when the valve in bore 65 at the left of FIG. 3 opens. These gases are fired and exploded in chamber 191 and then exhausted through exhaust outlet 52.

It will be noted that in chambers 190 and 192, gases enter behind the pistons in said chambers and compress gases in front of said pistons. In chambers 191 and 193, gases explode at the rear of the pistons in said chambers and exhaust the gases in front of said pistons in said chambers.

The firing is alternated in any suitable manner between the chambers 191 and 193. The exhaust operations are alternated between chambers 191 and 193. The inlet of fuel gas is alternated between chambers 192, 190, and the compression operations are alternated between said chambes 192, 190.

Rods 300 screwed into threaded openings 301 are for the purpose of attaching the power transmission mechanism (not shown).

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. An engine comprising a casing having a pair of spaced, coextensive, substantially elliptically shaped cavities having parallel long axes and coaxial short axes, cylindrical rotor portions rotating in said cavities and rotatably contacting opposed sides of the cavities at their short axes, respectively, means to connect said rotor portions for concurrent rotation at the same rate of speed, sliding piston means on each of said rotor portions having wiping contact with the internal surface of the cavity for said rotor portion, said cavities each having an intake chamber on one side of the rotor portion in said cavity and an exhaust chamber on the other side of said rotor portion in said cavity, gas inlet means for each intake chamber, gas outlet means for each exhaust chamber, spark plug means for each exhaust chamber, a pair of separate passages in the casing and between the cavities and each connecting the intake chamber of one cavity with the exhaust chamber of the other cavity, separate valves in said passages, respectively, and means to alternately actuate said valves in synchronous relation with the rotation of said rotor portions in the respective cavities to open and close said passages, said cavities having parallel transverse axes, and said valve actuating means comprising means mounted for rotation on the axes of said rotor portions, said casing comprising a central section, said central section being formed with said cavities, said cavities being coextensive with said central section, side sections fixed to opposite sides of said central section, and said means mounted for rotation being located on one side of the central section, said valve actuating means being located on the other side of the central section.

2. The combination of claim 1, said means controlled by said valves comprising valve rods located in transverse bores crossing said passages, and actuators pivoted to said other side section and actuated by said valve actuating means to operate said valve rods, respectively.

* * * * *